(12) United States Patent
Liao

(10) Patent No.: US 8,102,371 B2
(45) Date of Patent: Jan. 24, 2012

(54) CALIBRATION METHOD OF PROJECTION EFFECT

(75) Inventor: Chih-Ming Liao, Taoyuan (TW)

(73) Assignee: Chung-Shan Institute of Science and Technology, Armaments Bureau, Ministry of National Defense, Taoyuan County (TW)

( * ) Notice: Subject to any disclaimer, the term of this patent is extended or adjusted under 35 U.S.C. 154(b) by 624 days.

(21) Appl. No.: 12/276,249

(22) Filed: Nov. 21, 2008

(65) Prior Publication Data

US 2010/0127986 A1    May 27, 2010

(51) Int. Cl.
*G06F 3/033* (2006.01)

(52) U.S. Cl. .......... 345/166; 345/175; 345/178

(58) Field of Classification Search .......... 345/156, 345/163, 179, 424, 166, 175, 178, 589; 356/394
See application file for complete search history.

(56) References Cited

U.S. PATENT DOCUMENTS

| | | | |
|---|---|---|---|
| 6,122,065 A * | 9/2000 | Gauthier | 356/394 |
| 7,071,950 B2 * | 7/2006 | Fujioka et al. | 345/589 |
| 7,342,575 B1 * | 3/2008 | Hartwell et al. | 345/179 |
| 2002/0036617 A1 * | 3/2002 | Pryor | 345/156 |
| 2005/0156943 A1 * | 7/2005 | Fujioka et al. | 345/589 |
| 2006/0044266 A1 * | 3/2006 | Chin et al. | 345/156 |
| 2006/0164393 A1 * | 7/2006 | Wu et al. | 345/163 |
| 2007/0146325 A1 * | 6/2007 | Poston et al. | 345/163 |
| 2009/0079737 A1 * | 3/2009 | Inoue et al. | 345/424 |

* cited by examiner

*Primary Examiner* — Thuy Pardo

(57) ABSTRACT

The present invention provides a calibration method of projection effect. The calibration method of projection effect according to the invention comprises the following steps. The first, step (a) is performed to make an optical navigation system move along a predetermined trace relative to an object plane. Then, step (b) is performed to sense the predetermined trace by a sensor to obtain a projection trace. The next, step (c) is performed to calculate a projection effect value according to the included angle between a reflected light and the object plane. Finally, step (d) is performed to calibrate the projection trace with the projection effect value to obtain a calibration trace which is in proportion to the predetermined trace.

15 Claims, 6 Drawing Sheets

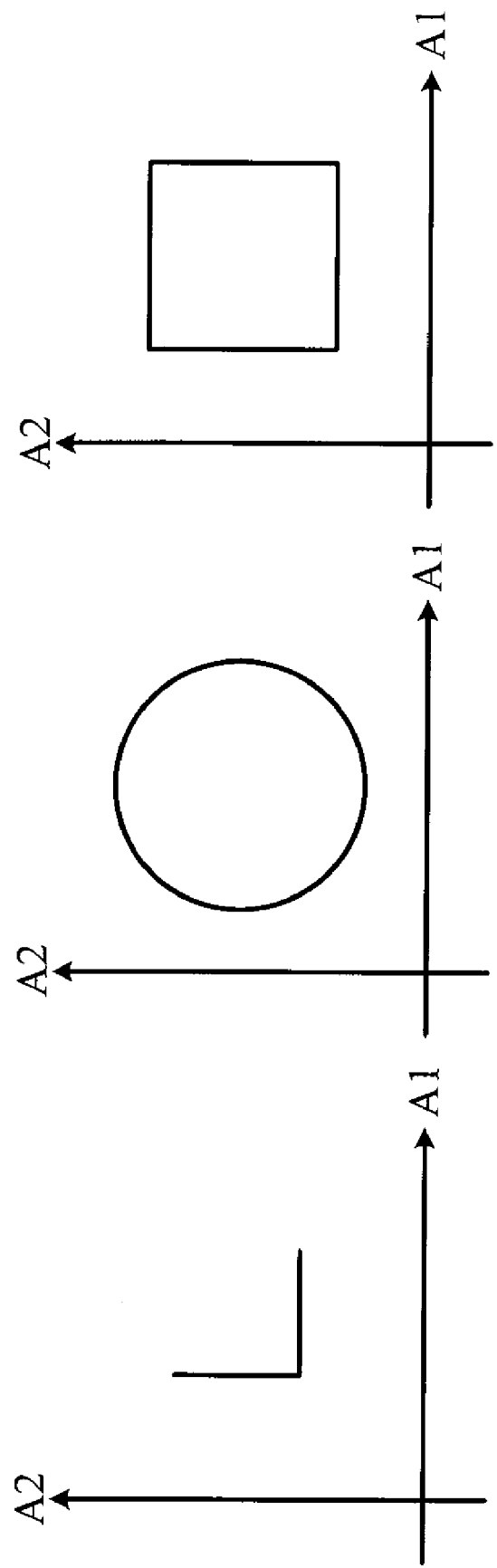

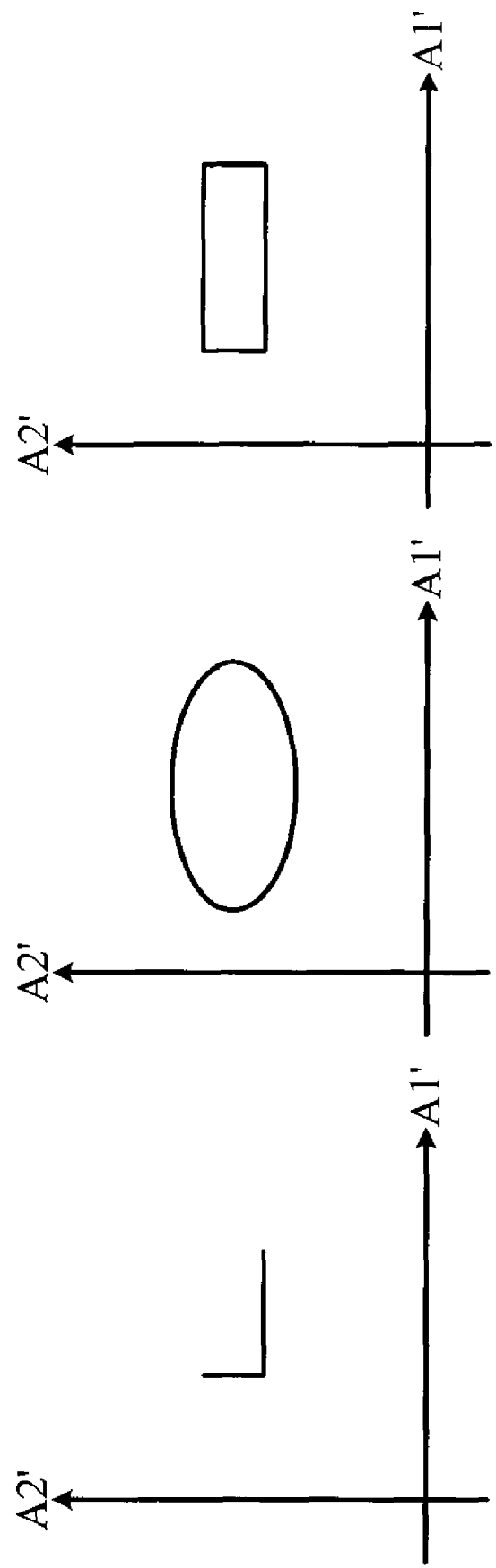

CALIBRATION METHOD OF PROJECTION EFFECT

BACKGROUND OF THE INVENTION

1. Field of the Invention

The present invention relates generally to a calibration method of projection effect, and more particularly, the calibration method of projection effect is for detecting and calibrating the projection effect results from the fact that the object plane is not parallel with the image plane of the optical navigation system.

2. Description of the Prior Art

Please refer to FIG. 1. FIG. 1 illustrates optical devices of an optical mouse 1. As illustrated in FIG. 1, the optical devices of the optical mouse 1 comprise a light emitting module 10 and a sensor 12. The sensor 12 could be an image sensor. There is an image plane 120 on the sensor 12. The optical mouse 1 is performed on an object plane 20 of an object 2. There is a normal line of the object plane 20 on the object plane 20. The light emitted by the light emitting module 10 illuminates on the object plane 20 with an incident angle $\theta_i$ (the included angle between the incident light and the normal line of the object plane 20). The reflected light or the scattered light reflected from the object plane 20 are received by the sensor 12 in the direction of the reflected angle $\theta_r$ (the included angle between the reflected light and the normal line of the object plane 20), wherein the reflected angle $\theta_r$ could equal to the incident angle $\theta_i$ (that is to say, specular reflection) so as to enable the sensor 12 to receive the energy of the reflected light. Or the reflected angle $\theta_r$ could not be equal to the incident angle $\theta_i$ so as to enable the sensor 12 to receive the energy of the scattered light. If the image plane 120 is perpendicular to the direction of the reflected light but not parallel to the object plane 20 (that is to say, there is an included angle $\theta_s$ between the reflected light and the object plane 20), the sensor 12 will obtain better intensity of the optical signal due to such disposal so as to control the output of the light emitting module 10 to decrease the consumption of power and save electricity as expected.

After the sensor 12 receiving image, the image is delivered to the image processor. The image processor could be an integrated circuit (IC), an application-specific integrated circuit (ASIC), a digital signal processing (DSP), or a central processing unit (CPU). After receiving the image, the image processor proceeds with correlation comparison in real time, and calculates the information about the displacement (for example, the displacement Δx in x direction and the displacement Δy in y direction). By means of the information, the personal computer is able to control the mouse cursor to shift to the relative position.

However, when the said image plane 120 on the sensor 12 is not parallel to the object plane 20 of the object 2, and the object plane 20 moves relative to the optical device, the displacement on the object plane 20 will cause the projection effect on the image plane 120. Please refer to FIG. 2. FIG. 2 illustrates the projection effect between object plane 20 and the image plane 120. As illustrated in FIG. 2, the first direction A1 is on the object plane 20 and is perpendicular to the reflected light. The second direction A2 is on the object plane 20 and is perpendicular to the first direction A1. When there is a displacement d between the object plane 20 and the optical device in the first direction A1, the displacement of the reflected light on the image plane 120 in the relative first direction A1 will be d as well because the image plane 120 is parallel to the first direction A1. On the other hand, when there is a displacement d between the object plane 20 and the optical device in the second direction A2, the displacement of the reflected light on the image plane 120 in the relative second direction A2 will cause the projection effect because there is an included angle $\theta_s$ between the image plane 120 and the object plane 20, then the displacement of the reflected light on the image plane 120 in the relative second direction A2 will become d sin $\theta_s$ instead of d. In other words, the ratio of the displacement on the object plane 20 in the first direction A1 and that in the second direction A2 is 1:1, but on the other hand, the ratio of the displacement on the image plane 120 in the first direction A1 and that in the second direction A2 is 1:sin $\theta_s$. The fact that the image plane 120 and the object plane 20 are not parallel results in the distortion of the optical mouse 1's locating trace. For example, when the optical mouse 1 moves in a circle trace on the object plane 20, the trace may become an ellipse on the image plane 120; when the optical mouse 1 moves in a square trace on the object plane 20, the trace may become a rectangle on the image plane 120.

Therefore, the main aspect of the invention is to provide a calibration method of projection effect for detecting and calibrating the projection effect results from the fact that the object plane is not parallel with the image plane of the optical navigation system. Moreover, the calibration method of projection effect can be applied to the calibrating of optical navigation systems such as optical mice, optical pens and optical positioning systems. The distortion of the projection effect can be solved by means of this method so as to improve the precision of the optical navigation system.

SUMMARY OF THE INVENTION

An aspect of the present invention is to provide a calibration method of projection effect. The calibration method of projection effect can be applied to an optical navigation system. The optical navigation system is provided with a light emitting module and a sensor, wherein the light emitted by the light emitting module is reflected to the sensor by an object plane. The calibration method of projection effect comprises the following steps. Firstly, make an optical navigation system move along a predetermined trace relative to an object plane. Then, sense the predetermined trace by a sensor to obtain a projection trace. Next, calculate a projection effect value according to the included angle between a reflected light and the object plane. Eventually, calibrate the projection trace with the projection effect value to obtain a calibration trace which is in proportion to the predetermined trace.

Another aspect of the present invention is to provide another calibration method of projection effect. The calibration method of projection effect can be also applied to optical navigation system. The optical navigation system is provided with a light emitting module and a sensor, wherein the light emitted by the light emitting module is reflected to the sensor by an object plane. The calibration method of projection effect comprises the following steps. Firstly, make an optical navigation system move along a predetermined trace relative to an object plane. Then, sense the predetermined trace by a sensor to obtain a projection trace. Next, calculate a projection effect value according to the projection trace. Eventually, calibrate the projection trace according to the predetermined trace and the projection effect value to obtain a calibration trace in proportion to the predetermined trace.

Accordingly, the calibration method of projection effect of the present invention is for detecting and calibrating the projection effect results from the fact that the object plane is not parallel with the image plane of the optical navigation system.

The distortion of the projection effect can be solved by means of this method so as to improve the precision of the optical navigation system.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

FIG. 5A illustrates the L-shape predetermined trace moving on the object plane 20.

FIG. 5B illustrates the circle predetermined trace moving on the object plane 20.

FIG. 5C illustrates the square predetermined trace moving on the object plane 20.

FIG. 6A illustrates the L-shape projection trace moving on the image plane 120 corresponding to the predetermined trace in FIG. 5A.

FIG. 6B illustrates the circle projection trace moving on the image plane 120 corresponding to the predetermined trace in FIG. 5B.

FIG. 6C illustrates the square projection trace moving on the image plane 120 corresponding to the predetermined trace in FIG. 5C.

DETAILED DESCRIPTION OF THE INVENTION

The present invention provides a calibration method of projection effect for detecting and calibrating the projection effect results from the fact that the object plane is not parallel with the image plane of the optical navigation system. The objective of the present invention will no doubt become obvious to those of ordinary skill in the art after reading the following detailed description of the preferred embodiment.

Figure 1:
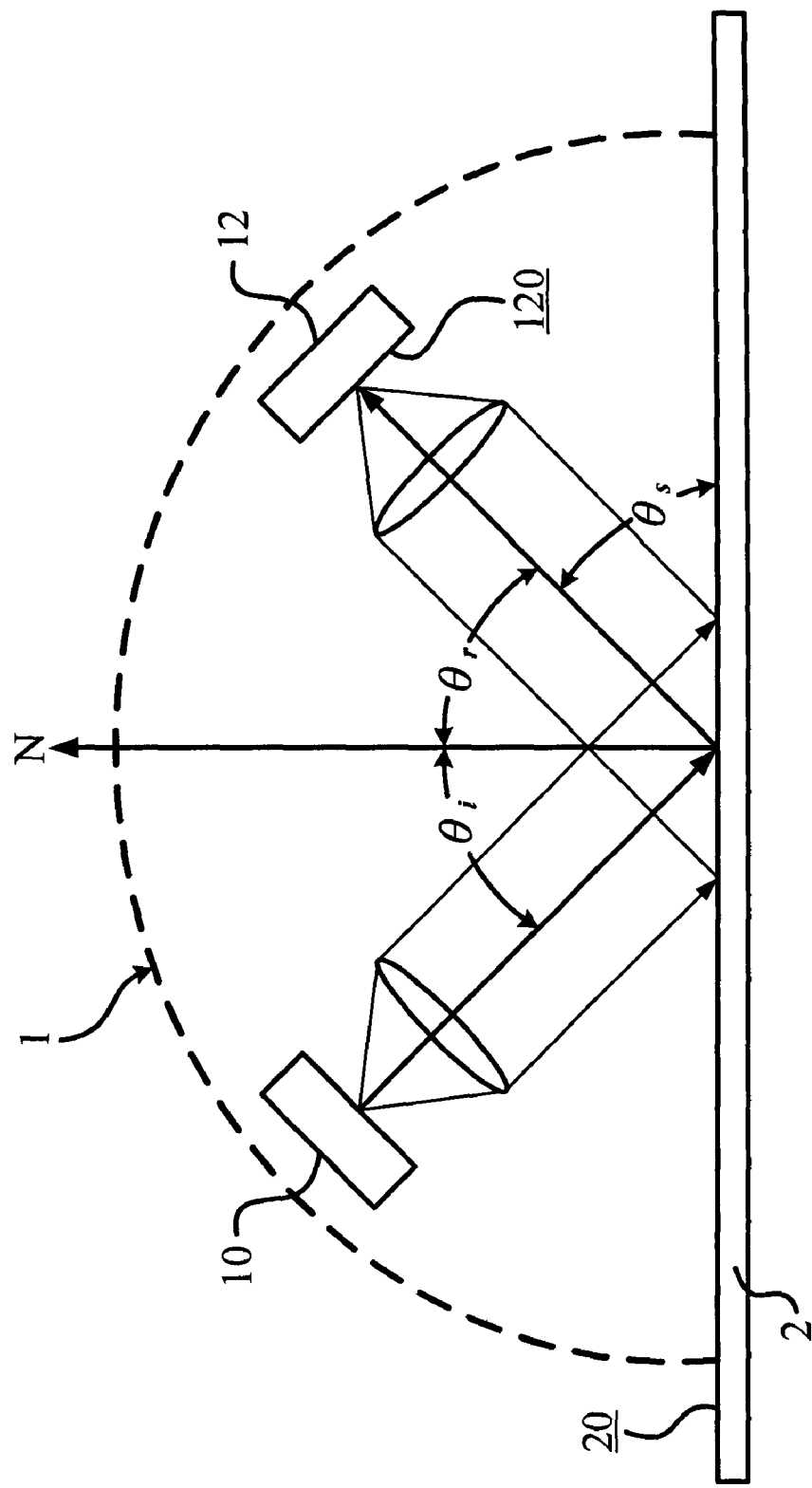
FIG. 1 illustrates optical devices of an optical mouse.
Figure 2:
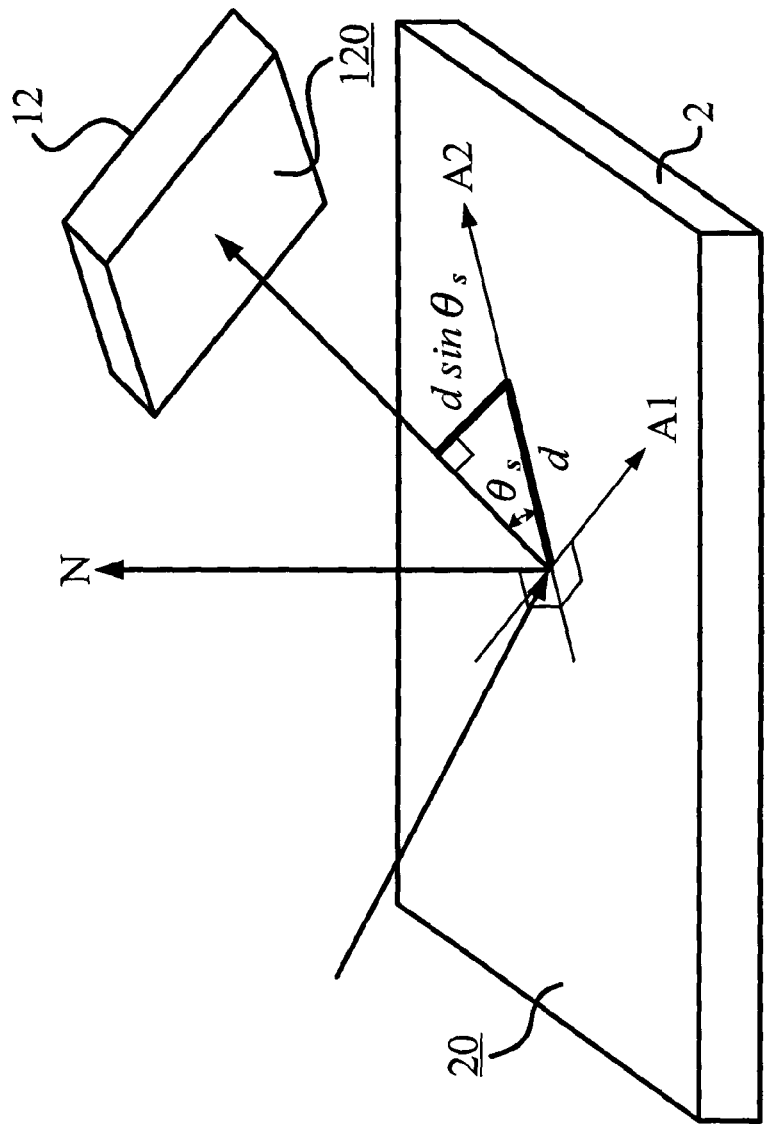
FIG. 2 illustrates the projection effect between an object plane and the image plane in FIG. 1.
Figure 3:
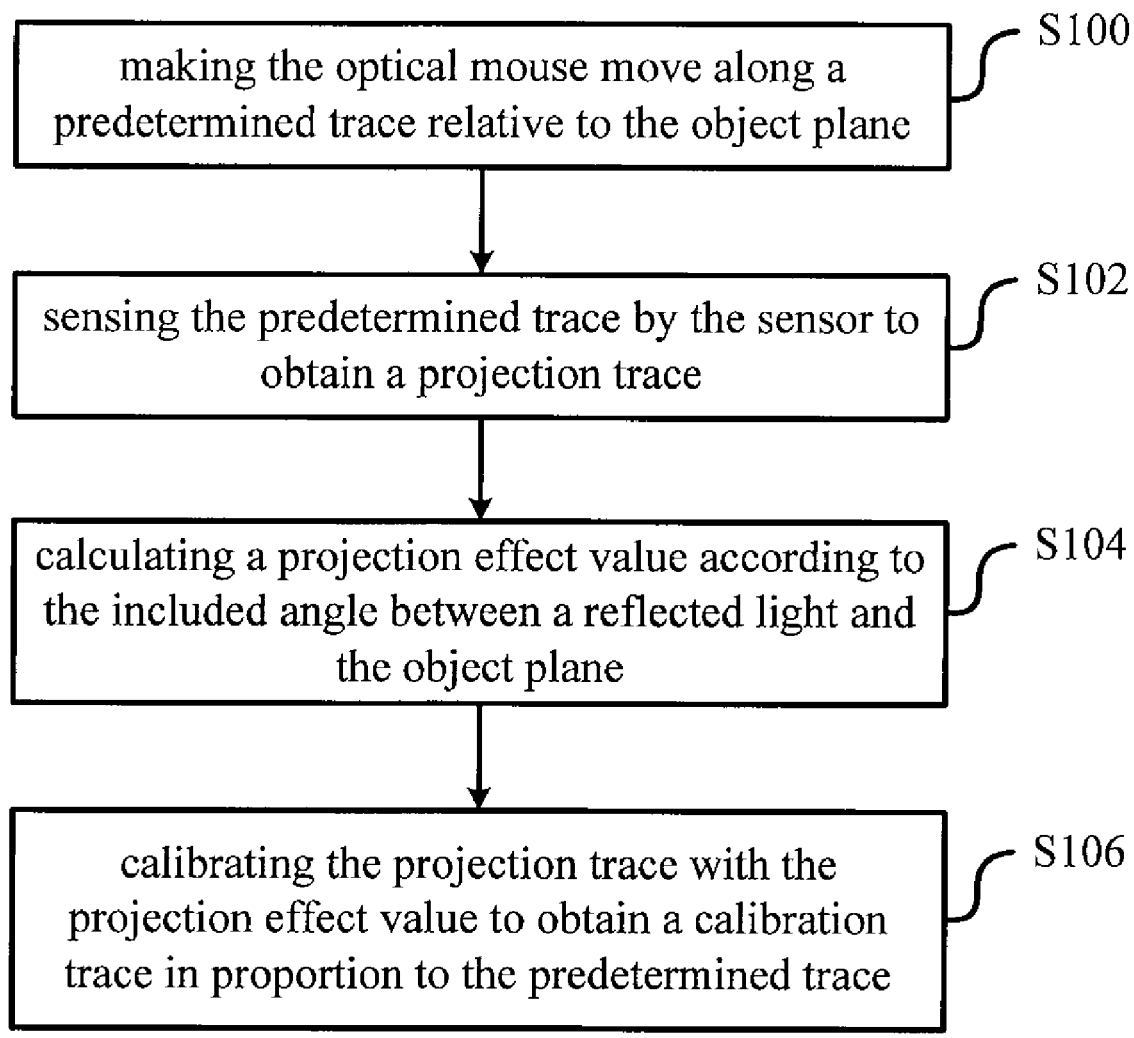
FIG. 3 is a flowchart demonstrating a calibration method of projection effect in accordance with a first preferred embodiment of the invention.

Please refer to FIG. 3 which accompanies FIG. 1 and FIG. 2. FIG. 3 is a flowchart demonstrating a calibration method of projection effect in accordance with a first preferred embodiment of the invention. The calibration method of projection effect can be applied to optical navigation systems. The optical navigation systems could be, but not limited to, an optical mouse 1 illustrated in FIG. 1. The optical navigation systems could also be an optical pen, an optical positioning system or a finger navigator, etc. Take the optical mouse 1 for example, it's provided with a light emitting module 10 and a sensor 12 as illustrated in FIG. 1. The light emitted by the light emitting module 10 is reflected to the sensor 12 by an object plane 20 of an object 2. The light source of the light emitting module 10 could be an infrared source, a laser source, or a light emitting diode, etc. According to the first preferred embodiment of the invention, the calibration method of projection effect comprises the following steps.

Please refer to FIG. 3, according to the first preferred embodiment of the calibration method of projection effect, step S100 is performed first to make the optical mouse 1 move along a predetermined trace relative to the object plane 20.

After that, step S102 is performed to sense the predetermined trace by the sensor 12 to obtain a projection trace in the first preferred embodiment.

More particularly, the incident angle $\theta_i$, the reflected angle $\theta_r$, and the included angle $\theta_s$ between the reflected light and the object plane 20 have been known since the optical mouse 1 was designed in the first preferred embodiment. Accordingly, step S104 is then performed immediately in the first preferred embodiment to calculate a projection effect value PF according to the included angle $\theta_s$ between a reflected light and the object plane 20.

As illustrated in FIG. 2, a first direction A1 perpendicular to the reflected light and a second direction A2 perpendicular to the first direction A1 are defined on the object plane 20. For example, the predetermined trace has a first real displacement along the first direction A1 and the predetermined trace has a second real displacement along the second direction A2. Correspondingly, the projection trace formed by the reflected light on the image plane 120 of the sensor 12 has a first projection displacement corresponding to the first real displacement and a second projection displacement corresponding to the second real displacement.

For example, if the ratio of the first real displacement and the second real displacement on the object plane 20 of the object 2 is 1:1, then the ratio of the first projection displacement and the second projection displacement on the image plane 120 of the sensor 12 is 1:sin $\theta_s$. Thus, the projection effect value PF caused by the fact that the object plane 20 of the object 2 is not parallel with the image plane 120 of the optical mouse 1 can be calculated by the following equation:

$$PF = \frac{\sin\theta}{1};$$

The included angle $\theta_s$ between the reflected light and the object plane 20 can be calculated by the following equation:

$$\theta_s = \sin^{-1}(PF).$$

Eventually, step S106 can be performed in the first preferred embodiment to calibrate the projection trace with the projection effect value to obtain a calibration trace which is in proportion to the predetermined trace. More particularly, the second projection displacement after calibration can be calculated by the following equation:

$$\Delta y' = \Delta y \div PF = \Delta y \times \frac{1}{PF};$$

Wherein $\Delta y$ is the second projection displacement sensed by the sensor 12 and $\Delta y'$ is the second projection displacement after calibration. Therefore, when the optical mouse 1 moves relative to the object plane 20, the image sensed by the sensor 12 is delivered to an image processor (not shown in the FIG.) to proceed with an correlation comparison in real time and calculate the projection effect value PF so as to get the information about the displacement. More particularly, the image processor could be, but not limited to, an integrated circuit (IC), an application-specific integrated circuit (ASIC), a digital signal processing (DSP), or a central processing unit (CPU).

Thus, the resulting distortion from the projection effect can be solved by means of the calibration method of projection effect.

Figure 4:
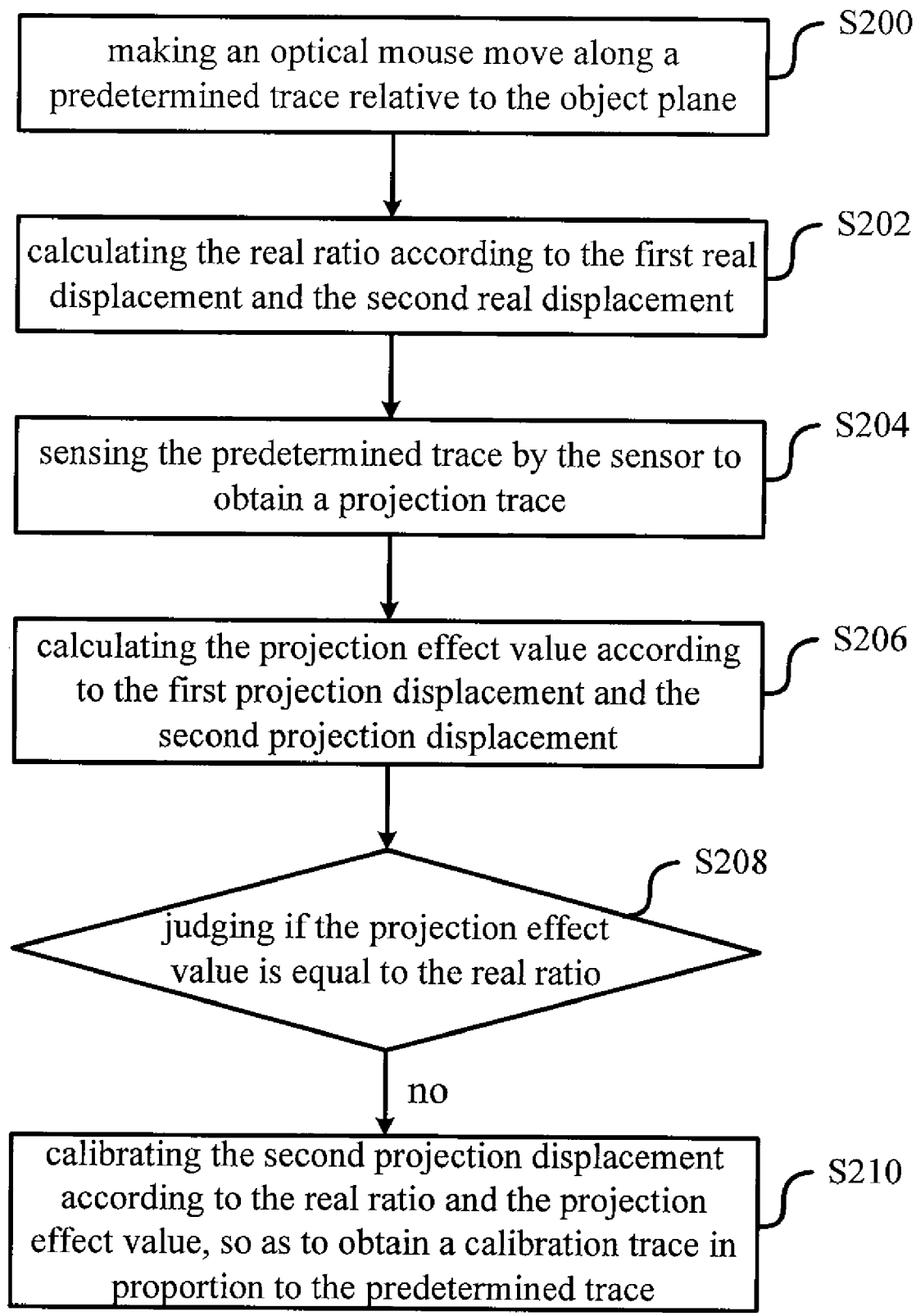
FIG. 4 is a flowchart demonstrating a calibration method of projection effect in accordance with a second preferred embodiment of the invention.

Please refer to FIG. 4 and accompany with FIG. 1 and FIG. 2. FIG. 4 is a flowchart demonstrating a calibration method of projection effect in accordance with a second preferred embodiment of the invention. Take the optical mouse 1 for example, it's provided with a light emitting module 10 and a sensor 12 as illustrated in FIG. 1. The light emitted by the light emitting module 10 is reflected to the sensor 12 by an object plane 20. According to the second preferred embodiment of the invention, the calibration method of projection effect comprises the following steps.

Please refer to FIG. 4, according to the second preferred embodiment of the calibration method of projection effect, step S200 is performed first to make the optical mouse 1 move along a predetermined trace relative to the object plane 20. This step could be, but not limited to, performed by an X-Y table or a robot.

As illustrated in FIG. 2, a first direction A1 perpendicular to the reflected light and a second direction A2 perpendicular to the first direction A1 are defined on the object plane 20. For example, the predetermined trace has a first real displacement along the first direction A1 and the predetermined trace has a second real displacement along the second direction A2. Correspondingly, the projection trace formed by the reflected light on the image plane 120 of the sensor 12 has a first projection displacement corresponding to the first real displacement and a second projection displacement corresponding to the second real displacement.

Thus, step S202 is then performed in the second preferred embodiment to calculate a real ratio according to the first real displacement and the second real displacement. According to an embodiment, the ratio of the first real displacement and the second real displacement could be 1. The said predetermined trace could be, but not limited to, an L-shape trace, a circle trace and a square trace. The predetermined trace is not limited in a symmetric trace. Contrarily, as long as the displacement along the first direction A1 is equal to that along the second direction A2, that's called a trace with a real ratio 1. Please refer to FIG. 5A to FIG. 5C. FIG. 5A illustrates the L-shape predetermined trace moving on the object plane 20. FIG. 5B illustrates the circle predetermined trace moving on the object plane 20. FIG. 5C illustrates the square predetermined trace moving on the object plane 20.

Next, step S204 is performed in the second preferred embodiment to sense the predetermined trace by a sensor 12 to obtain a projection trace Particularly, the projection trace formed by the reflected light on the image plane 120 of the sensor 12 has a first projection displacement corresponding to the first real displacement and a second projection displacement corresponding to the second real displacement. Therefore, step S206 can be performed in the second preferred embodiment to calculate a projection effect value according to the first projection displacement and the second displacement. The projection effect value PF caused by the fact that the object plane 20 of the object 2 is not parallel with the image plane 120 of the optical mouse 1 can be calculated by the following equation:

$$PF = \frac{Y_1 d}{X_1 d};$$

Wherein $X_1 d$ is the first projection displacement, and $Y_1 d$ is the second projection displacement.

As illustrated in FIG. 4, step S208 is performed immediately in the second preferred embodiment to judge if the projection effect value is equal to the real ratio. According to the embodiment, it's necessary to judge if the projection effect value is 1. If not, it means that the projection effect exists in the optical device of the optical mouse 1 and must be eliminated. Please refer to FIG. 6A to FIG. 6C. FIG. 6A illustrates the L-shape projection trace moving on the image plane 120 corresponding to the predetermined trace in FIG. 5A. FIG. 6B illustrates the circle projection trace moving on the image plane 120 corresponding to the predetermined trace in FIG. 5B. FIG. 6C illustrates the square projection trace moving on the image plane 120 corresponding to the predetermined trace in FIG. 5C. Wherein the first projection direction A1' on the image plane 120 is corresponding to the first direction A1 on the object plane, and the second projection direction A2' on the image plane 120 is corresponding to the second direction A2 on the object plane. More particularly, the said projection trace could be, but not limited to, an L-shape trace, a circle trace and a square trace.

Consequently, if the projection effect value PF is not equal to the real ratio, step S210 is finally performed in the second preferred embodiment to calibrate the second projection displacement according to the real ratio and the projection effect value to obtain a calibration trace in proportion to the predetermined trace. More particularly, the second projection displacement after calibration can be calculated by the following equation:

$$\Delta y' = \Delta y \div PF = \Delta y \times \frac{X_1 d}{Y_1 d};$$

Wherein $\Delta y$ is the second projection displacement sensed by the sensor 12 and $\Delta y'$ is the second projection displacement after calibration. Therefore, when the optical mouse 1 moves relative to the object plane 20, the image sensed by the sensor 12 is delivered to an image processor to proceed with correlation comparison in real lime and calculate the projection effect value PF so as to get the information about the displacement. Thus, the resulting distortion from the projection effect can be solved by means of the calibration method of projection effect.

According to another embodiment of the invention, the said ratio of the first real displacement to the second real displacement could not be 1. The real ratio of the first real displacement to the second displacement is shown below:

$$R = \frac{Y_0 d}{X_0 d};$$

Wherein R is the real ratio, $X_0 d$ is the first real displacement and $Y_0 d$ is the second real displacement.

Therefore, step S204 can be performed in the second preferred embodiment to sense the predetermined trace by the sensor 12, so as to get the projection trace. Then step S206 is performed in the second preferred embodiment to calculate a projection effect value according to the first projection displacement and the second displacement.

Thus, the projection effect value PF caused by the fact that the object plane 20 of the object 2 is not parallel with the image plane 120 of the optical mouse 1 can be calculated by the following equation:

$$PF = \frac{Y_2 d}{X_2 d};$$

Wherein $X_2 d$ is the first projection displacement, and $Y_2 d$ is the second projection displacement.

As illustrated in FIG. 4, step S208 is performed immediately to judge if the projection effect value is equal to the real ratio. According to the embodiment, it's necessary to judge if the projection effect value is R. If not, it means that the projection effect exist in the optical device of the optical mouse 1 and must be eliminated.

Consequently, if the projection effect value is not proportion to the real ratio, step S210 is finally performed in the second preferred embodiment to calibrate the second projection displacement according to the real ratio and the projection effect value to obtain a calibration trace in proportion to the predetermined trace. More particularly, the second projection displacement after calibration can be calculated by the following equation:

$$\Delta y' = \Delta y \div PF \times R = \Delta y \times \frac{1}{PF} \times R = \Delta y \times \frac{X_2 d}{Y_2 d} \times R;$$

Wherein $\Delta y$ is the second projection displacement sensed by the sensor 12 and $\Delta y'$ is the second projection displacement after calibration. Therefore, when the optical mouse 1 moves relative to the object plane 20, the image sensed by the sensor 12 is delivered to an image processor (not shown in the FIG.) to proceed with correlation comparison in real time and calculate the projection effect value PF so as to get the information about the displacement. Thus, the resulting distortion from the projection effect can be solved by means of the calibration method of projection effect.

From what has been mentioned above, it is easy to see the calibration method of the projection effect of the present invention is for detecting and calibrating the projection effect results from the fact that the object plane is not parallel with the image plane of the optical navigation system such as optical mice, optical pens and optical positioning systems. Thus, the distortion of the projection effect can be solved by means of this method to improve the precision of the optical navigation system.

Although the present invention has been illustrated and described with reference to the preferred embodiment thereof it should be understood that it is in no way limited to the details of such embodiment and is capable of numerous modifications within the scope of the appended claims.

What is claimed is:

1. A calibration method of projection effect between an object plane O upon which an optical navigation system is disposed, and an image plane M of a sensor of the optical navigation system comprising a light emitting module and the sensor,
    wherein an incident light is emitted by the light emitting module and reflected by the object plane O as an reflected light on the image plane M,
    an included angle $\theta_i$ is an angle of non-zero value between the reflected light and O,
    a directional A1 on the object plane is perpendicular to the reflected light, and
    a directional A2 on the object plane is perpendicular to A1;
    the calibration method of projection effect comprising steps:
    (a) moving the optical navigation system with a first and a second real displacement of $X_{Od}$, and $Y_{Od}$ along A1 and A2, respectively, along a predetermined trace relative to the object plane, and a ratio of $Y_{Od}:X_{Od}$ being R;
    (b) sensing the predetermined trace by the sensor to obtain a projection trace;
    (c) calculating a projection effect value PF according to $\theta_s$: if R=1, PF=sin $\theta_s$; and
    (d) calibrating the projection trace with the projection effect PF, to obtain a calibration trace in proportion to the predetermined trace.

2. The calibration method of projection effect of claim 1, wherein the projection trace has a second projection displacement corresponding to the second real displacement, and step (d) further comprising: (d1) calibrating the second projection displacement with the projection effect value to obtain the calibration trace in proportion to the predetermined trace.

3. The calibration method of projection effect of claim 1, wherein the optical navigation system is an optical mouse or a finger navigator.

4. The calibration method of projection effect of claim 1, wherein step (b) to step (d) are performed by an image processor.

5. The calibration method of projection effect of claim 4, wherein the image processor is one selected from a group consisting of an integrated circuit (IC), an application-specific integrated circuit (ASIC), a digital signal processing (DSP), and a central processing unit (CPU).

6. A calibration method of projection effect between an object plane O upon which an optical navigation system is disposed, and an image plane M of a sensor of the optical navigation system comprising a light emitting module and the sensor,
    wherein an incident light is emitted by the light emitting module and reflected by the object plane O as an reflected light on the image plane M,
    an included angle $\theta_i$ is an angle of non-zero value between the reflected light and O,
    a directional A1 on the object plane is perpendicular to the reflected light, and
    a directional A2 on the object plane is perpendicular to A1;
    the calibration method of projection effect comprising steps:
    (a) moving an optical navigation system with a first and a second real displacement of $X_{Od}$, and $Y_{Od}$ along A1 and A2, respectively, along a predetermined trace relative to the object plane O;
    (b) sensing the predetermined trace by the sensor to obtain a projection trace;
    (c) calculating a projection effect value according to the projection trace; and
    d) calibrating the projection trace according to the predetermined trace and the projection effect value to obtain a calibration trace in proportion to the predetermined trace.

7. The calibration method of projection effect of claim 6, wherein step (a) further comprising: step (a1) calculating la real ratio being the ratio of the second real displacement to the first real displacement.

8. The calibration method of projection effect of claim 7, wherein the real ratio is 1.

9. The calibration method of projection effect of claim 8, wherein the predetermined trace is one selected from a group consisting of an L-shape trace, a circle trace and a square trace.

10. The calibration method of projection effect of claim 7, wherein the projection trace has a first projection displacement corresponding to the first real displacement and a second projection displacement corresponding to the second real displacement, and step (c) further comprising: step (c1) calculating the projection effect value according to the first projection displacement and the second projection displacement.

11. The calibration method of projection effect of claim 10, wherein the step (d) further comprises: step (d1) judging if the projection effect value is equal to the real ratio, if not, then perform step (d2) (d2) calibrating the second projection displacement according to the real ratio and the projection effect value, so as to obtain a calibration trace in proportion to the predetermined trace.

12. The calibration method of projection effect of claim 6, wherein the optical navigation system is an optical mouse or a finger navigator.

13. The calibration method of projection effect of claim 6, wherein step (a) is performed by an XY-Table or a robot.

14. The calibration method of projection effect of claim 6, wherein step (b) to step (d) are performed by an image processor.

15. The calibration method of projection effect of claim 14, wherein the image processor is one selected from a group consisting of an integrated circuit (IC), an application-specific integrated circuit (ASIC), a digital signal processing (DSP), a central processing unit (CPU).

\* \* \* \* \*